(12) United States Patent
Park et al.

(10) Patent No.: US 8,418,228 B2
(45) Date of Patent: Apr. 9, 2013

(54) CONVERGED ACCESS CONTROL METHOD USING NETWORK ACCESS DEVICE AT PENETRATION NODE OF IP NETWORK OF CONVERGENCE ALL-IP NETWORK

(75) Inventors: No Ik Park, Daejeon (KR); Soon Seok Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 573 days.

(21) Appl. No.: 12/629,542

(22) Filed: Dec. 2, 2009

(65) Prior Publication Data

US 2010/0146591 A1    Jun. 10, 2010

(30) Foreign Application Priority Data

Dec. 3, 2008   (KR) .................. 10-2008-0121853
Jun. 8, 2009   (KR) .................. 10-2009-0050623

(51) Int. Cl.
*H04L 29/06*     (2006.01)

(52) U.S. Cl.
USPC ............... 726/3; 370/350; 370/352; 370/356; 455/518

(58) Field of Classification Search ...... 726/3; 370/350, 370/352, 356; 455/518
See application file for complete search history.

(56) References Cited

U.S. PATENT DOCUMENTS

| | | | | |
|---|---|---|---|---|
| 7,023,838 | B1 * | 4/2006 | Hahn et al. ................... | 370/352 |
| 7,752,301 | B1 * | 7/2010 | Maiocco et al. ............... | 709/224 |
| 2002/0062379 | A1 * | 5/2002 | Widegren et al. ............. | 709/227 |
| 2003/0103454 | A1 * | 6/2003 | Wahl et al. .................... | 370/229 |
| 2003/0114167 | A1 * | 6/2003 | Chen et al. .................... | 455/453 |
| 2004/0081086 | A1 * | 4/2004 | Hippelainen et al. ......... | 370/227 |
| 2004/0203658 | A1 * | 10/2004 | Narayanan ................. | 455/414.1 |
| 2005/0068929 | A1 * | 3/2005 | Chang et al. .................. | 370/338 |
| 2005/0102420 | A1 * | 5/2005 | Major et al. .................. | 709/238 |
| 2005/0152364 | A1 | 7/2005 | Tagami et al. | |
| 2005/0181764 | A1 * | 8/2005 | Hahn et al. .................... | 455/411 |
| 2005/0207419 | A1 | 9/2005 | Kohzuki et al. | |
| 2005/0286504 | A1 * | 12/2005 | Kwon ........................... | 370/356 |
| 2006/0218302 | A1 | 9/2006 | Chia et al. | |
| 2007/0115915 | A1 * | 5/2007 | Sheng et al. .................. | 370/350 |
| 2007/0213053 | A1 | 9/2007 | Do | |
| 2008/0004061 | A1 | 1/2008 | Takeda | |
| 2008/0165679 | A1 * | 7/2008 | Anderson et al. ............. | 370/230 |
| 2008/0192763 | A1 * | 8/2008 | Davis et al. .................. | 370/412 |

(Continued)

FOREIGN PATENT DOCUMENTS

| | | |
|---|---|---|
| JP | 2000-332787 | 11/2000 |
| JP | 2001-237831 | 8/2001 |

(Continued)

OTHER PUBLICATIONS

Sun, J, Mobility Management Reconsideration: Hierarchical Model and Flow Control Methodology, 2003, PIMRC-IEEE, p. 2809-2813.*

*Primary Examiner* — Taghi Arani
*Assistant Examiner* — Gregory Lane
(74) *Attorney, Agent, or Firm* — Staas & Halsey LLP (57) ABSTRACT

There is provided a converged access control method using a network access device at an edge node of an IP network of a convergence ALL-IP network that performs authentication control, QoS control, traffic control and mobility control in a consistent manner using a network access device located at penetration nodes of an IP network of a convergence ALL-IP network to effectively accommodate a subscriber network in various access environments, thereby ensuring network flexibility and scalability.

10 Claims, 8 Drawing Sheets

U.S. PATENT DOCUMENTS

| | | | |
|---|---|---|---|
| 2008/0253394 A1* | 10/2008 | Spinar et al. | 370/468 |
| 2009/0029710 A1* | 1/2009 | Ochiai et al. | 455/450 |
| 2009/0313366 A1* | 12/2009 | Nakamura et al. | 709/223 |
| 2010/0080161 A1* | 4/2010 | Hayashi | 370/312 |
| 2011/0173678 A1* | 7/2011 | Kaippallimalil et al. | 726/4 |

FOREIGN PATENT DOCUMENTS

| | | |
|---|---|---|
| JP | 2001-358722 | 12/2001 |
| JP | 2004-320159 | 11/2004 |
| JP | 2005-202589 | 7/2005 |
| JP | 2007-180889 | 7/2007 |
| JP | 2008-16944 | 1/2008 |
| JP | 2008-503170 | 1/2008 |
| JP | 2008-511240 | 4/2008 |
| KR | 2001-0091168 | 10/2001 |
| KR | 10-2005-0066286 | 6/2005 |
| KR | 10-2007-0090716 | 9/2007 |
| WO | 2006/022469 A1 | 3/2006 |
| WO | 2006/118732 A2 | 11/2006 |

* cited by examiner

FIG. 7

CONVERGED ACCESS CONTROL METHOD USING NETWORK ACCESS DEVICE AT PENETRATION NODE OF IP NETWORK OF CONVERGENCE ALL-IP NETWORK

CROSS-REFERENCE TO RELATED APPLICATIONS

This application claims the priorities of Korean Patent Application Nos. 10-2009-0050623 filed on Jun. 8, 2009, and 10-2008-0121853 filed on Dec. 3, 2008, in the Korean Intellectual Property Office, the disclosure of which are incorporated herein by reference.

BACKGROUND OF THE INVENTION

1. Field of the Invention

The present invention relates to access control architecture in a converged access ALL-IP network, and more particularly, to a converged access control method allowing effective authentication control, QoS control, traffic control, and mobility control in a network level.

2. Description of the Related Art

Network access environments for users have rapidly diversified into various wireless environments, such as High Speed Packet Access (HSPA), Wireless Broadband (WiBro) and WiFi, as well as existing wired environments.

In particular, as for the wireless environment, Long Term Evolution (LTE)/System Architecture Evolution (SAE) is under development on the basis of the 3rd Generation Partnership Project (3GPP). Even though the development of LTE/SAE is completed, various wireless access environments are expected to be available for a long period of time.

A convergence ALL-IP network may be configured such that these various access networks are accommodated using a single control system and a single management system. To this end, a structure is required to provide effective authentication control, QoS control, traffic control and mobility control using an integrated platform.

Standardization of the Network Attachment Control Function (NACF) defined in the International Telecommunication Union, Telecommunication Sector (ITU-T) is being carried out. However, this is limited in terms of accommodating the above-described various access environments in an effective manner.

SUMMARY OF THE INVENTION

An aspect of the present invention provides a converged access control method using a network access device at an edge node of an IP network of a convergence ALL-IP network that can effectively perform authentication control, QoS control, traffic control and mobility control in a convergence ALL-IP network.

According to an aspect of the present invention, there is provided an authentication method using a network access device at an edge node of an IP network of a convergence ALL-IP network, the authentication method including: acquiring, by the network access device, authentication information, when a terminal performs handover, by intercepting the authentication information being transmitted and received through the network access device when terminal information-based authentication in L2-level is performed between an authentication server and a wireless access device connected to the terminal being handed over; and allowing, by the network access device, transferral of a data packet corresponding to the terminal having the authentication information.

The authentication information may include terminal information of the terminal having successfully performed the terminal information-based authentication after being handed over.

According to another aspect of the present invention, there is provided a QoS control method using a network access device at an edge node of an IP network of a convergence ALL-IP network, the QoS control method including: controlling, by the network access device, QoS of downlink traffic on the basis of the amount of radio resources allocated; and controlling, by the network access device, controlling QoS of uplink traffic according to bandwidth information acquirable from call control signaling or a service-specific resource allocation policy.

The controlling of the QoS of the downlink traffic may include: acquiring the amount of radio resources allocated by a wireless access device provided in a wireless subscriber network to which the downlink traffic will be transferred; comparing the amount of radio resources allocated with a data amount of the downlink traffic; and performing scheduling and shaping of guaranteed downlink traffic at each service session and performing rate shaping of non-guaranteed downlink traffic according to the amount of wireless bandwidth allocated when the data amount of the downlink traffic exceeds the amount of radio resources.

The controlling of the QoS of the uplink traffic may include: receiving and setting service-specific policy control setting information; acquiring bandwidth information acquirable from the call control signaling through an SIP proxy or a session board controller (SBC) provided in the network access device, and performing resource control per service when SIP-based traffic is received; and performing resource control per service on the basis of the service-specific policy control setting information when traffic, which is not based on the SIP, is received.

According to another aspect of the present invention, there is provided a traffic control method using an authentication server, a policy server, a network control device and a network access device in a convergence ALL-IP network, the traffic control method using the network access device including: providing, by the authentication server, authentication information about a user, having completed authentication, to the policy server and the network control device; setting previous usage and a total amount of traffic allowed, corresponding to the user's authentication information, in the network access device while the policy server and the network control device interoperate with each other; and tracking, by the network access device, the user's traffic usage to update the previous usage, and performing traffic control of a terminal whose updated previous usage exceeds the total amount of traffic allowed.

The performing of the traffic control may include blocking traffic when the updated previous usage exceeds the total amount of traffic allowed.

A rate may be charged for the excess traffic when the updated previous usage exceeds the total amount of traffic allowed.

According to another aspect of the present invention, there is provided an IP mobility control method using a network access device at an edge node of an IP network of a convergence ALL-IP network to provide IP mobility control services between an IP terminal having a mobility control client mounted therein and a general terminal not having a mobility control client, the IP mobility control method including:

obtaining, by the network access device, terminal information and location information of the general terminal and data tunnel information of a radio section, and registering the obtained information in an IP mobility control server; establishing, by the network access device, mapping between a data tunnel of an IP network section and a data tunnel of a radio section when a request for communications with the general terminal is made so that the data tunnel of the IP network section is formed to perform communications with the general terminal; and obtaining the changed location information of the general terminal and the changed data tunnel information of the radio section when the general terminal is handed over, informing the IP mobility control server of the obtained information, and establishing mapping between the data tunnel of the IP network section and the changed data tunnel of the radio section.

The IP mobility control server may inform the IP terminal of the terminal information and the location information of the general terminal when the IP terminal requests communications with the general terminal, so that the data tunnel of the IP network section is formed to perform communications with the general terminal.

The network access device may obtain the terminal information and the location information of the IP terminal through the IP mobility control server to form the data terminal of the IP network section to perform communications with the IP terminal when the general terminal requests communications with the IP terminal having the mobility control client mounted therein.

The network access device may encapsulate traffic of the data tunnel of the radio section to transmit the encapsulated traffic through the data tunnel of the IP network section, and decapsulate traffic of the data tunnel of the IP network section to transmit the decapsulated traffic through the data tunnel of the radio section.

The network access device may recognize individual service traffic of the data tunnel of the radio section and the data tunnel of the IP network section according to each flow on the basis of 5-tuple or Deep Packet Inspection (DPI), and establishes mapping between the data tunnel of the radio section and the data tunnel of the IP network section.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art.

In the drawings, the shapes and dimensions may be exaggerated for clarity, and the same reference numerals will be used throughout to designate the same or like components.

Unless explicitly described to the contrary, the word "comprise" and variations such as "comprises" or "comprising," will be understood to imply the inclusion of stated elements but not the exclusion of any other elements.

Figure 1:
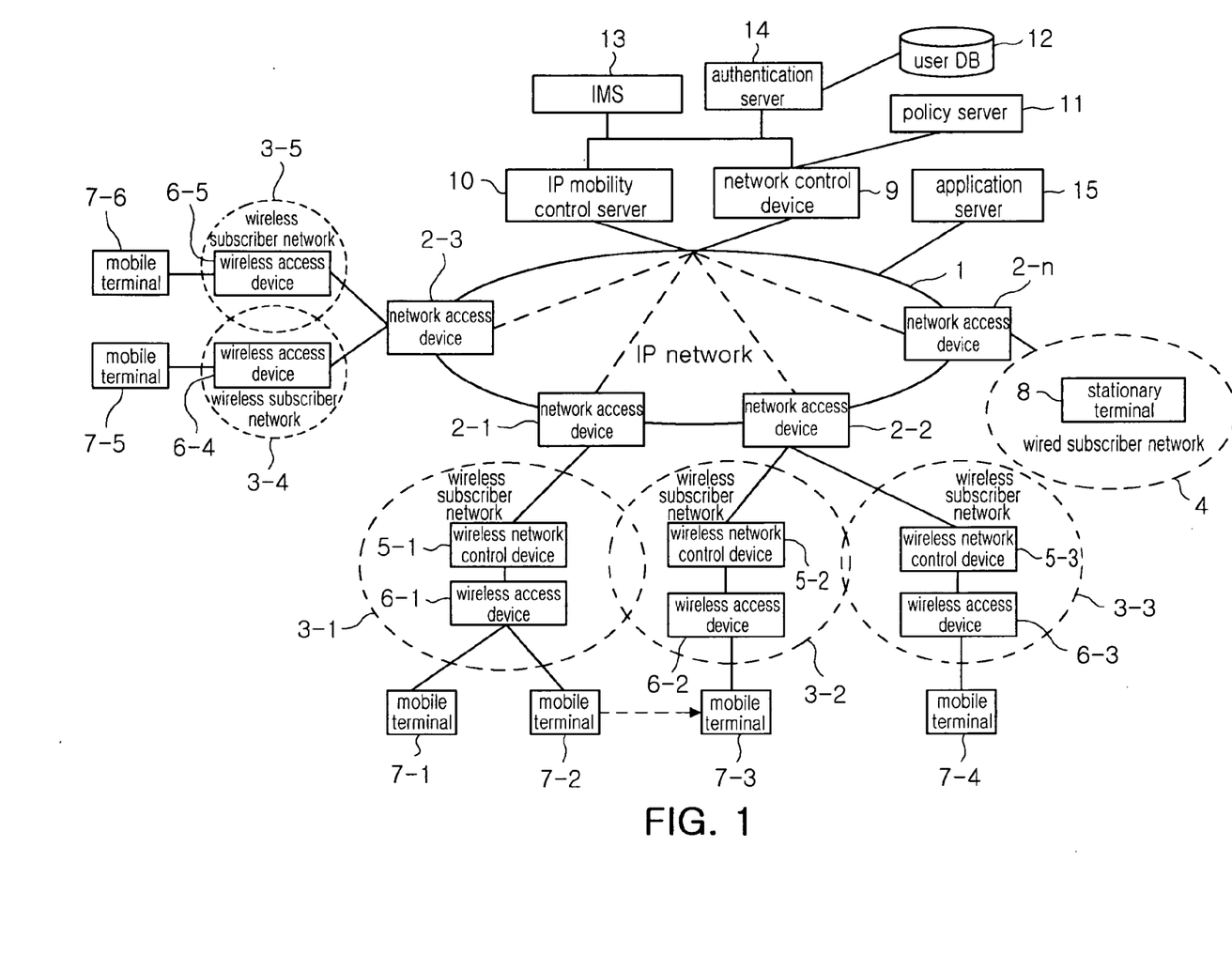
FIG. 1 is a network diagram illustrating access control in a convergence ALL-IP network according to an exemplary embodiment of the present invention.

FIG. 1 is a network diagram illustrating the configuration for access control in a convergence ALL-IP network according to an exemplary embodiment of the invention.

An IP network 1 can provide services based on Service Level Agreements (SLAs) that vary depending on individual users.

Network access devices 2-1 to 2-*n* are located at interconnection points between the IP network 1 and a plurality of subscriber networks 3-1 to 3-5 and 4, which serve as start points at which IP packets are processed. In particular, the network access devices 2-1 to 2-3 located at interconnection points between the IP network 1 and the wireless subscriber networks 3-1 to 3-5 perform various access control functions such as quick authentication control of a terminal being handed over, QoS control associated with resource allocation information of a wireless subscriber network, traffic usage control per subscriber and IP mobility support.

The plurality of subscriber networks 3-1 to 3-5 and 4 may include the wireless subscriber networks 3-1 to 3-5 that mobile terminals 7-1 to 7-6 access and the wired subscriber network 4 that a stationary terminal 8 accesses.

Wireless network control devices 5-1 to 5-3 are located within wireless subscriber networks 3-1 to 3-3, respectively, and perform resource control of the wireless subscriber networks. Wireless access devices 6-1 to 6-3 provide wireless network services to the mobile terminals 7-1 to 7-4 under the control of the wireless network control devices 5-1 to 5-3, respectively. Further, by configuring a wireless access device 6-5 to have the functions of the wireless network control devices 5-1 to 5-3, the wireless subscriber network 3-5 only includes the wireless access device 6-5. That is, a wireless access device and wireless network control devices may be integrated into one device or may be individual different devices separate from each other.

The mobile terminals 7-1 to 7-6 and the stationary terminal 8 may be provided with network services using a client/server architecture with an application server 15 and network services according to end-to-end communication with other mobile terminals. The mobile terminals 7-1 to 7-6 may have a single wireless interface or multiple wireless interfaces.

The network control device 9 receives subscriber information and service QoS information from a user DB 12 and a policy server 11 to control traffic in order to conform to a corresponding subscriber's Service Level Agreement (SLA).

Further, the network control device 9 receives user authentication information from an authentication server 14 to control the network access devices 2-1 to 2-n so that the network access devices transfer an authenticated user's traffic.

In particular, the network control device 9 according to this embodiment interoperates with the policy server 11 and provisions service-specific policy control setting information for the control of uplink traffic, the total amount of traffic allowed for each subscriber, and traffic usage to the network access devices 2-1 to 2-n.

An IP mobility control server 10 is provided with terminal information, location information, and data tunnel information of each terminal from the network access devices 2-1 to 2-n. When a mobile terminal accesses the IP network 1, the IP mobility control server 10 provides control associated with IP mobility of the mobile terminal and ensures service continuity when the mobile terminal moves.

The policy server 11 performs service policy control and maintains and manages information about a resource allocation policy for each service, the total amount of traffic allowed for each service, and traffic usage.

The user DB (Database) 12 stores a variety of information about a subscriber (or terminal) that accesses a network according to an exemplary embodiment of the invention, such as subscriber information and terminal information per subscriber.

The IP Multimedia Subsystem (IMS) 13 performs call control using a Session Initiation Protocol (SIP). The authentication sever 14 performs authentication of services and network access including a user's terminal information. The authentication server 14 may control the network access devices 2-1 to 2-n to allow a user to access a network on the basis of user authentication information.

In the convergence ALL-IP network having the above-described configuration, various functions are required in order to recognize users using various kinds of terminals via various kinds of wired/wireless subscriber networks and provide mobility services smoothly.

That is, the functions for quick authentication control of a terminal being handed over, QoS control associated with resource allocation information in a wireless subscriber network, traffic usage control per subscriber, and IP mobility support are required.

In this invention, these functions are referred to as Converged Access Control Functions (CACFs).

Since these converged access control functions are associated with a user's network access and IP traffic control, the CACFs should be performed at a start point of an IP network in terms of authentication and at a first point at which IP packets can be processed in terms of IP traffic.

In this embodiment, attention is placed on converged access control functions in the network access devices 2-1 to 2-n that are located at penetration nodes of the IP network 1. In particular, among converged access control functions being performed by the network access devices 2-1 to 2-n, an authentication control method of providing mobility, a QoS control method associated with resource allocation information of a wireless subscriber network, a user-specific network traffic control method, and a mobility control method are within the spirit of the present invention.

<Authentication Control>

An authentication control method according to this invention will now be described. This authentication control method is not performed when accessing a network for the first time, but is performed in a new subscriber network when a mobile terminal moves.

When the mobile terminal moves and accesses a new subscriber network (that is, during handover), if authentication via IP address or authentication based on ID/password is performed, delay may be caused by this authentication, and thus it may be difficult to perform a quick handover.

Therefore, in this invention, an authentication process is performed during handover on the basis of terminal information used to identify a terminal in a network, such as E.164 information and a media access control (MAC) address.

Basically, a mobile terminal, for example, the mobile terminal 7-2, is handed over and accesses the wireless access device 6-2 within a new subscriber network, authentication in an OSI layer 2 (L2) level on the basis of terminal information is performed between the wireless access device 6-2 and the authentication server 14 before performing user-level and IP address-level authentication processes. The terminal handed over to the new subscriber network can transmit and receive data packets only when terminal information-based authentication is successfully completed.

In this invention, by acquiring terminal information from information being transmitted and received through the terminal information-based authentication, and providing network access to the terminal, handed over to the subscriber network, additional authentication via IP address or additional authentication based on ID/password can be omitted.

Hereinafter, an authentication process according to an exemplary embodiment of the invention will be described in more detail with reference to FIG. 2.

Figure 2:
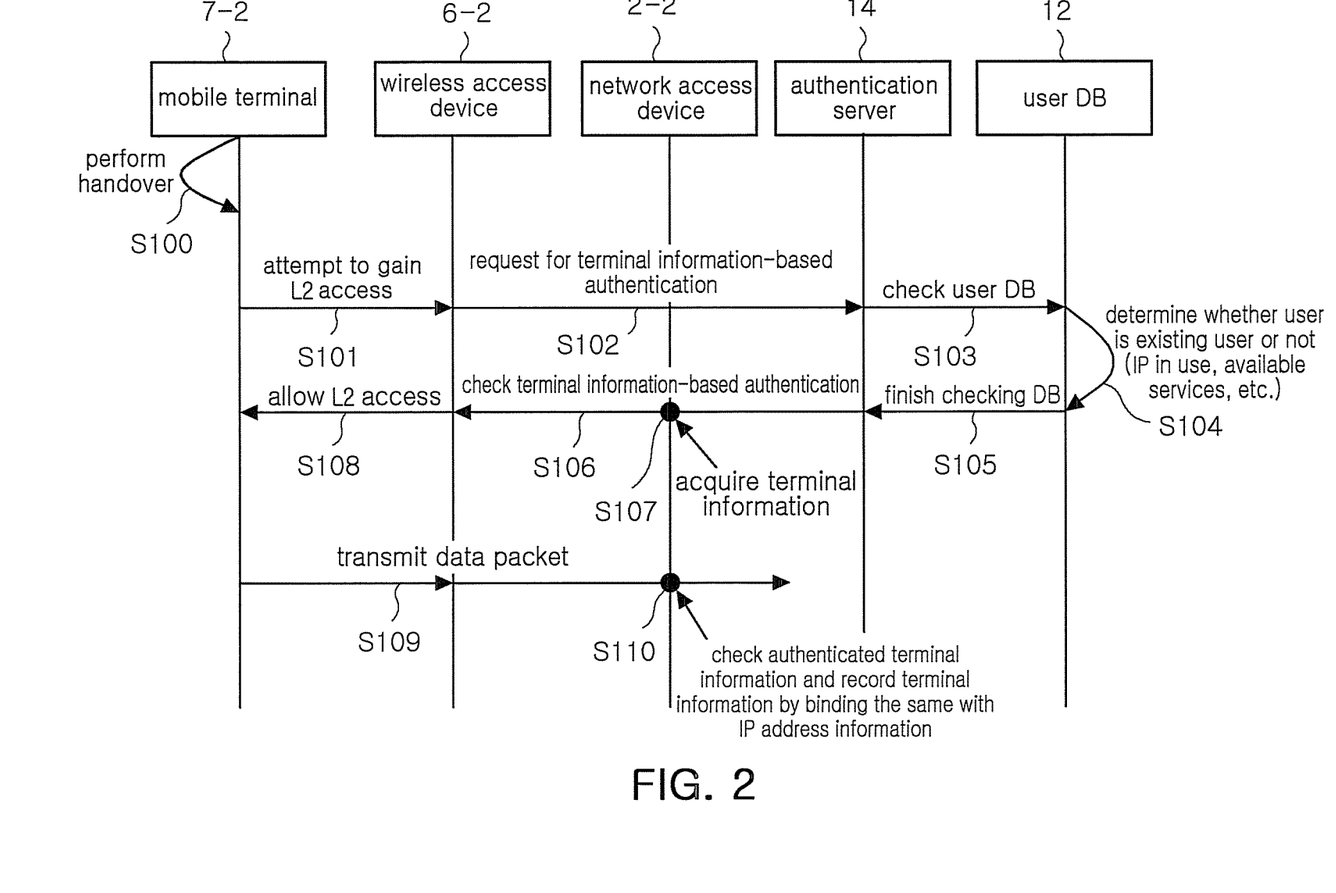
FIG. 2 is an operating flow chart illustrating an authentication control method in a convergence ALL-IP network according to an exemplary embodiment of the present invention.

FIG. 2 is an operational flow chart illustrating an authentication control method in a convergence ALL-IP network according to an exemplary embodiment of the invention.

First, a mobile terminal, for example, the mobile terminal 7-2 is handed over from an existing wireless subscriber network, for example, the wireless subscriber network 3-1 to a new wireless subscriber network, for example, the wireless subscriber network 3-2 in operation S100, the mobile terminal 7-2 transmits terminal information thereof to the wireless access device 6-2 within the new wireless subscriber network 3-2 and attempts to gain L2-level access to the wireless access device 6-2 in operation S101.

The wireless access device 6-2 then requests terminal information-based authentication to the authentication server 14, using the received terminal information in operation S102.

The authentication server 14 searches the user DB 12 and checks DB associated with the terminal information in operation 5103 to thereby acquire (single or multiple) terminal information provided when a user subscribed, an IP address being used by the user to access the network, available services and the like at operations S104 and S105.

The authentication server 14 performs terminal information-based authentication by comparing the terminal information acquired at operations 5104 and S105 with the terminal information transmitted in operation S102, and notifies the wireless access device 6-2 of an authentication result in operation S106.

The network access device 2-2 acquires the terminal information of the mobile terminal 7-2 by intercepting the authentication result that is supplied from the authentication server 14 to the wireless access device 6-2 or receiving the authentication result directly from the authentication server 14 in operation S107.

When the authentication of the mobile terminal 7-2 is successfully performed, and the wireless access device 6-2 allows L2-level access of the corresponding mobile terminal 7-2 in operation S110, the mobile terminal 7-2 starts to transmit a data packet in operation S112.

The network access device 2-2 checks an IP address and terminal information of the data packet transmitted from the mobile terminal 7-2. Further, if the data packet is transmitted from the terminal having the authenticated terminal information, the network access device 2-2 binds and records the IP address (that is, an IP address having undergone authentication before performing handover) and the terminal information of the corresponding data packet and allows the transmission of the data packet in operation S110. That is, the network access device 2-2 allows the mobile terminal 7-2 having the authenticated terminal information to access the IP network.

In this embodiment, it is determined whether the mobile terminal 7-2 handed over to the new subscriber network can be allowed to access the IP network using L2-level authentication information such as terminal information.

<QoS Control Associated with Resource Allocation Information of Wireless Subscriber Network>

A QoS control method associated with resource allocation information of a wireless subscriber network will now be described.

In comparison with network resources in a wired subscriber network, network resources in a wireless subscriber network are limited in terms of capacity. Therefore, in order to consider QoS both in the wired subscriber network and in the wireless subscriber network, QoS control using resource allocation information in the wireless subscriber network is required.

Figure 3A:
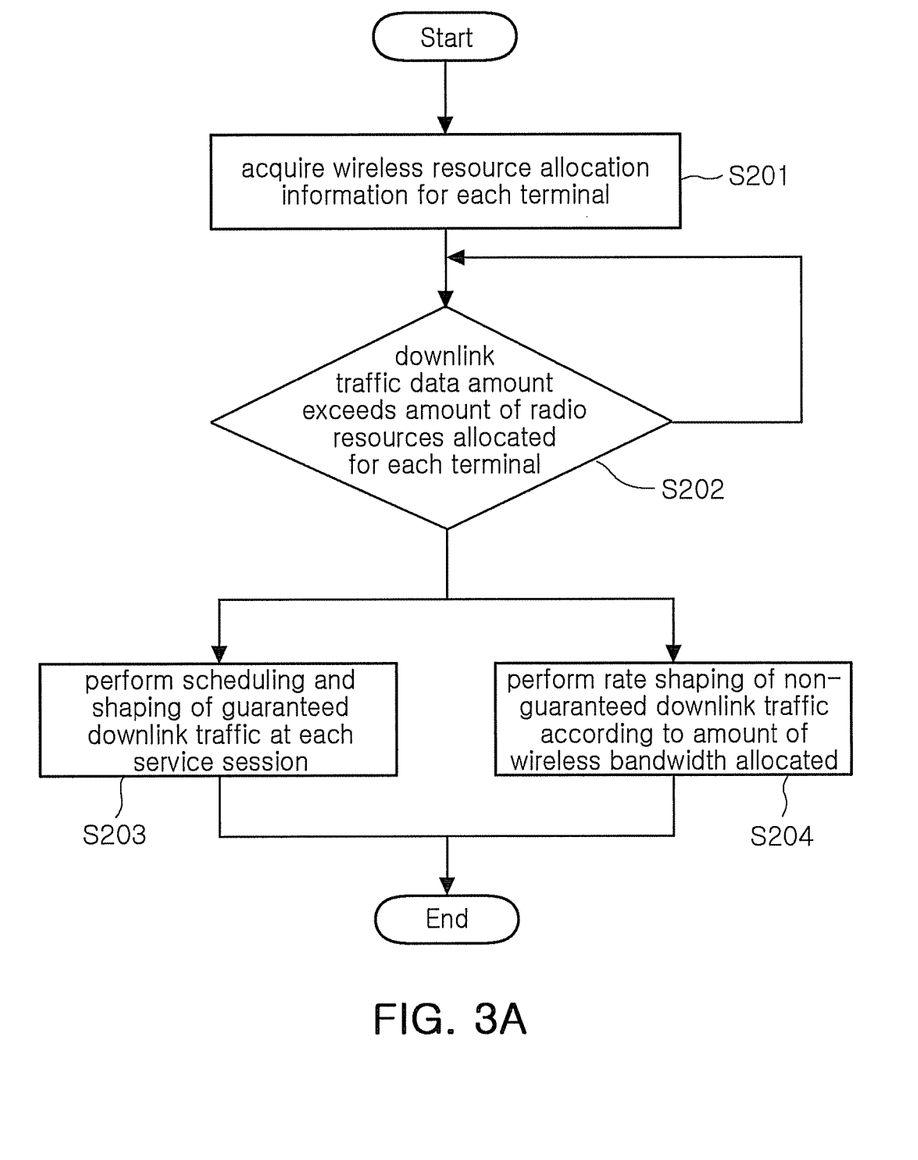
FIGS. 3A and 3B and FIG. 4 are operational flow chart illustrating a QoS control method in a convergence ALL-IP network according to an exemplary embodiment of the present invention.
Figure 3B:
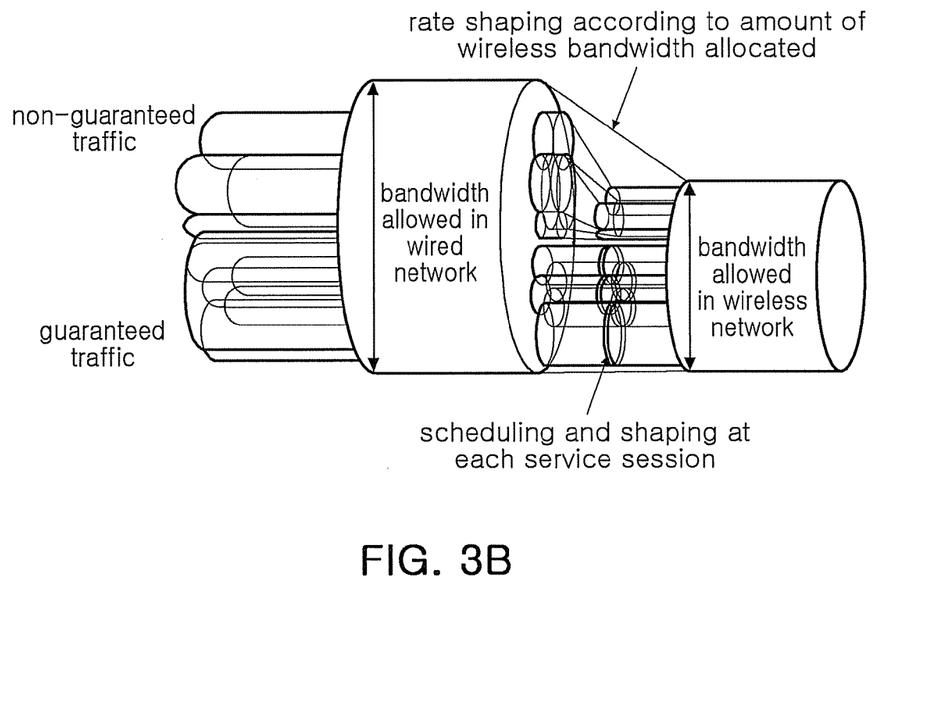
Figure 4:
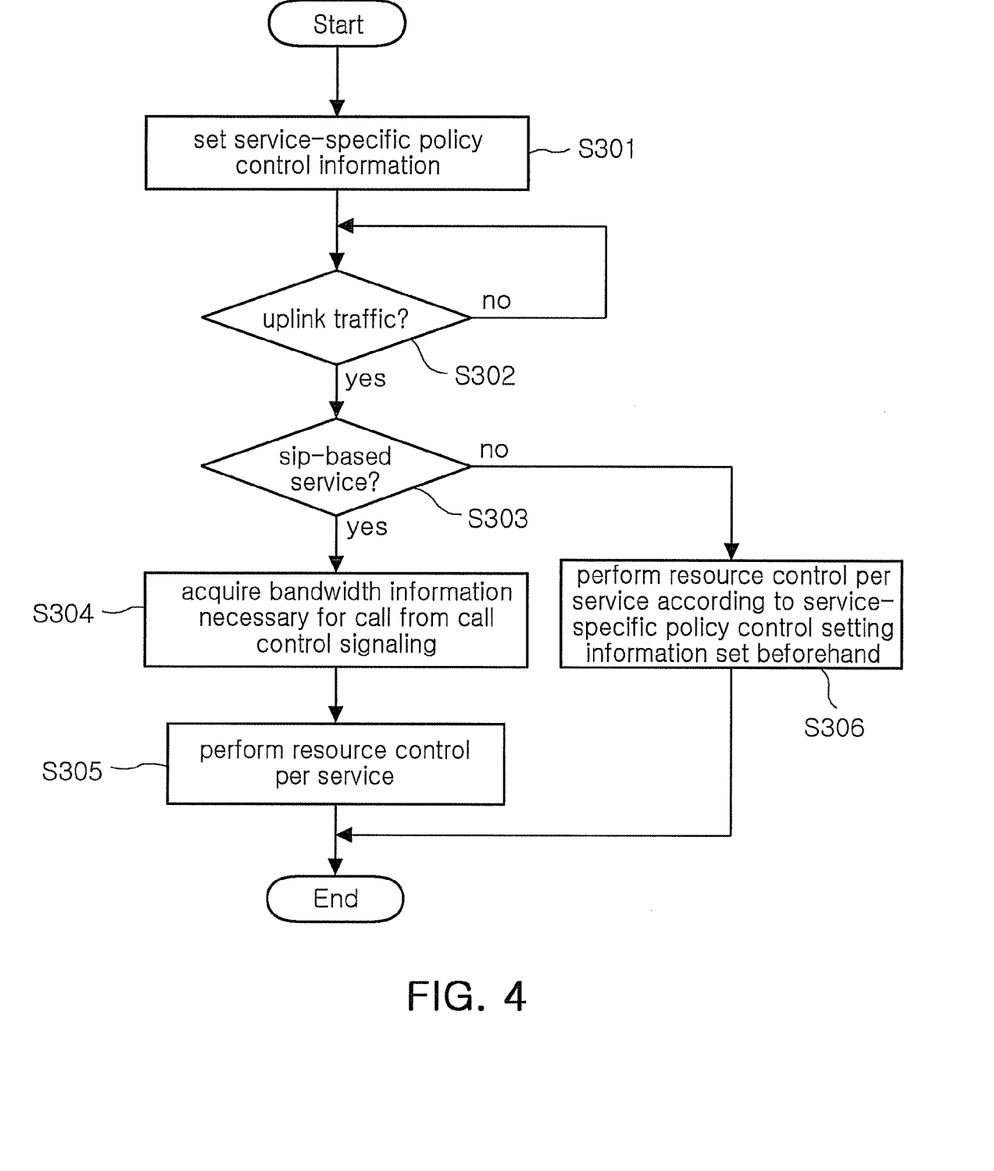

FIGS. 3A and 33 and FIG. 4 are operational flow charts illustrating a QoS control method in a convergence ALL-IP network according to an exemplary embodiment of the invention.

A QoS control method for downlink traffic will be described with reference to FIGS. 3A and 3B.

A network device, for example, the network access device 2-1 is supplied with wireless resource allocation information for each terminal from the wireless network control device 5-1 in operation S201.

When downlink traffic data exceeds the wireless resource allocation for each terminal, supplied in operation S201, in operation S202 by comparing the downlink traffic data and the wireless resource allocation for each terminal, as shown in FIG. 3B, scheduling and shaping are performed on guaranteed downlink traffic at each service session in order to guarantee secured QoS in operation S203. On the other hand, rate shaping is performed on non-guaranteed downlink traffic according to wireless bandwidth allocation with respect to the allocated bandwidth of the wireless subscriber network so as to use extra bandwidth remaining after the allocated bandwidth is used by the guaranteed downlink traffic in operation S204.

A QoS control method for uplink traffic will be described with reference to FIG. 4.

A network access device, for example, the network access device 2-1 needs to support both SIP-based services and services other than SIP-based services. Therefore, the network access device 2-1 is previously provided with service-specific policy control information of the policy server 11 through the network control device 9 and sets the service-specific policy control information in operation S301.

When uplink traffic is generated in operation S302, it is checked whether this uplink traffic is generated to provide SIP-based services in operation S303. When the uplink traffic is generated to provide the SIP-based services, the network access device 2-1 acquires bandwidth information required for call from call control signaling, using SBC function or SIP proxy function in operation S304, and performs resource control on corresponding traffic using the acquired bandwidth information in operation S305.

On the other hand, when uplink traffic is generated to provide services other than the SIP-based services in operation S303, the network access device 2-1 determines a service-specific resource allocation policy corresponding to the uplink traffic, currently being generated, according to the service-specific policy control information, set in operation S301, in operation S306.

<Per-user Traffic Usage Control>

A per-user traffic usage control method according to an exemplary embodiment of the invention will now be described.

There is a need for a per-user traffic usage control method in order to apply a service model to ensure the profitability of communication service providers, such as a measured rate system or a partial measured rate system. For example, as for P2P services, the total P2P traffic usage permitted for a fixed monthly charge is determined, and when exceeding limited usage, differential rates need to be charged according to the amount of traffic being generated.

Figure 5:
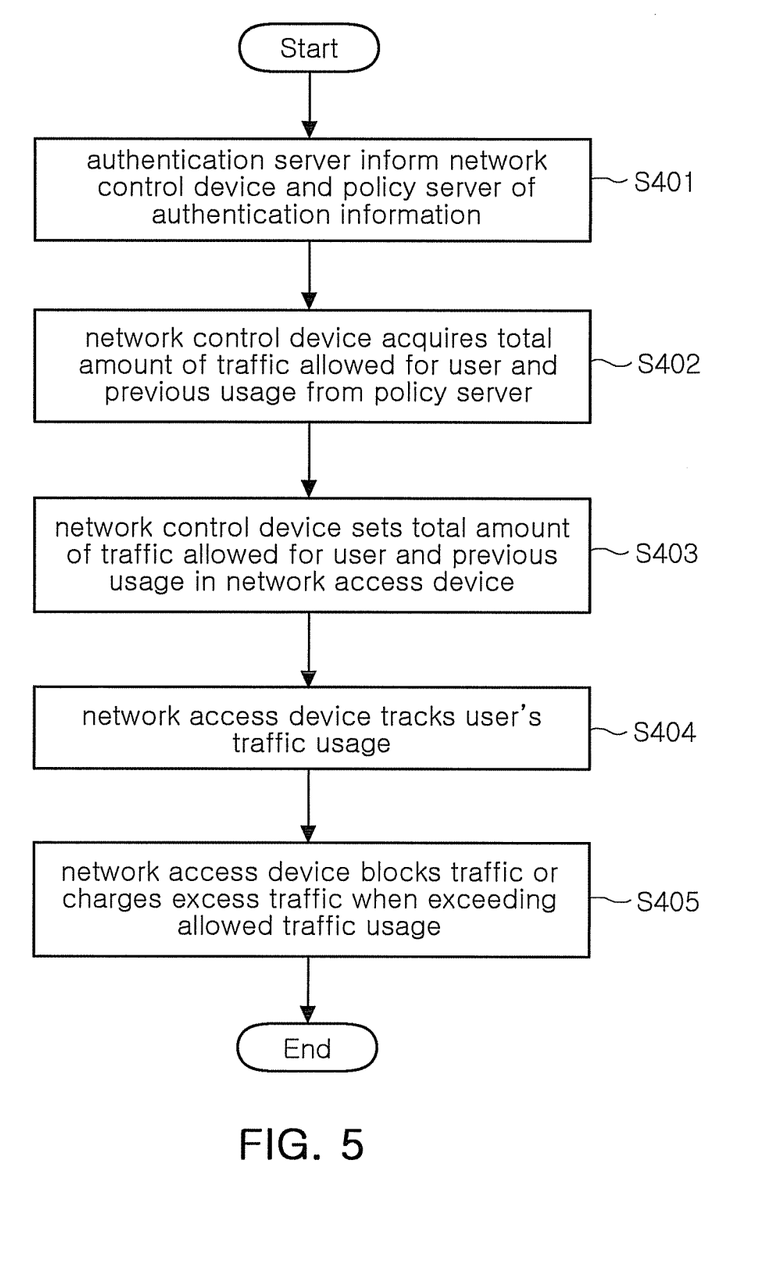
FIG. 5 is an operational flow chart illustrating a method of controlling traffic usage in a convergence ALL-IP network according to an exemplary embodiment of the present invention.

FIG. 5 is an operational flow chart illustrating a traffic usage control method in a convergence ALL-IP network according to an exemplary embodiment of the invention.

After a user accesses a network through the mobile terminals 7-1 to 7-6 or the stationary terminal 8 and performs authentication, the authentication server 14 provides authentication information to the network control device 9 and the policy server 11 in operation S401.

The network control device 9 inquires of the policy server 11 about the total amount of traffic allowed for a user and previous usage information corresponding to authentication information in operation S402.

The network control device 9 then receives the total amount of traffic allowed to the user and the previous usage information supplied from the policy server 11 and sets the information as control information for a corresponding network control device, for example, the network access device 7-1, controls traffic usage in operation S403.

The network access device 7-1 determines, using data IP address information, whether traffic is transmitted to a corresponding user's terminal or is generated by the corresponding user's terminal, and tracks corresponding user's traffic usage in operation S404.

When traffic usage exceeds the total amount of traffic allowed to the user while the user is using a network in operation S405, the network access device 7-1 takes corresponding measures. That is, the network access device 7-1 may block the excess traffic or charges the user for the excess traffic in association with the policy server 11 or the application server 15 in operation 5405.

<IP Mobility Control>

Figure 6:
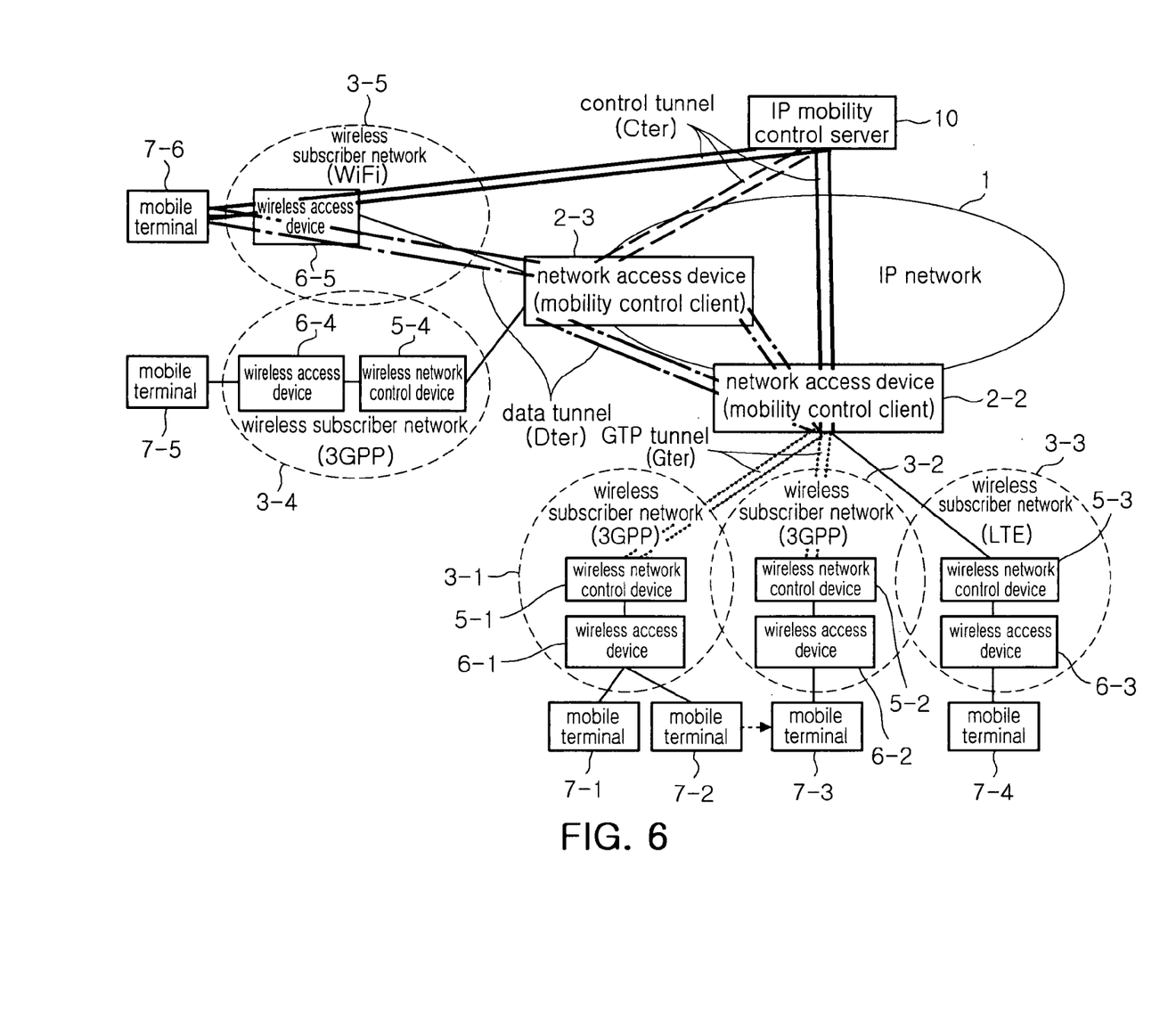
FIG. 6 is a network diagram illustrating the configuration to which an IP mobility control method is applied according to an exemplary embodiment of the present invention.

Finally, an IP mobility control method according to an exemplary embodiment of the invention will be described. An IP mobility control method according to this embodiment uses the IP mobility control server 10 and terminals having mobility client functions.

FIG. 6 is a view illustrating a network diagram illustrating the configuration to which an IP mobility control method according to an exemplary embodiment of the invention is applied.

As shown in FIG. 6, when the mobile terminal 7-6 undergoes IP mobility control, a control tunnel Cter is generated for a control signal between the mobile terminal 7-6 and the IP mobility control server 10. A data tunnel Dter is then generated for data communications between the mobile terminal 7-6 and another party terminal. Here, the control tunnel Cter and the data tunnel Dter are generated using the known technique, and a detailed description thereof will be omitted.

The network access devices 2-2 and 2-3 according to this embodiment have mobility control clients mounted therein to thereby provide mobility services to both a terminal (hereinafter, referred to as an "IP terminal") having a mobility client function, such as a WiFi mobile terminal, and terminals 7-1 to 7-5 (hereinafter, referred to as "general terminals") without mobility client functions, such as a 3GPP mobile terminal and an LTE mobile terminal, through the IP mobility control server 10 during IP-based data communications.

Mobility control clients of the network access devices 2-2 and 2-3 acquire the general terminals' terminal information (address information) and location information in order to provide IP mobility services to the mobile terminals, and inform the IP mobility control server 10 of the acquired terminal information and location information through control tunnels Cter between the network access devices 2-2 and 2-3 and the IP mobility control server 10. The IP mobility control server 10 determines and records terminal information of each general terminal and information about which network access device has a mobility control client therein control each general terminal.

When the IP terminal requests communications with the general terminals, the IP mobility control server 10 informs the IP terminal of the general terminals' terminal information and information about the network access devices 2-2 and 2-3 controlling the corresponding terminals, and controls so that data tunnels Dter are generated between the corresponding terminals and the network access devices to which a correspondent node is connected.

When the general terminals request communications with the IP terminal, the mobility control clients of the network access devices 2-2 and 2-3 acquire address information and location information of corresponding nodes from the IP mobility control server 10 to thereby generate data tunnels between the network access devices 2-2 and 2-3 and correspondent nodes.

The mobility control clients of the network access devices 2-2 and 2-3 encapsulate traffic in a radio section with respect to the uplink traffic using data tunnels being generated when providing IP mobility services. When data tunnels are formed in the radio section, the mobility control clients establish mapping between the data tunnels and the data tunnels being generated when providing the IP mobility services. On the other hand, as for downlink traffic, the mobility control clients decapsulate packets transferred through the data channels being generated when providing the IP mobility services, and transfer the decapsulated packets to target general terminals. When data tunnels are formed in the radio section, the mobility control clients establish mapping between the data tunnels and the data channels, being generated when providing the IP mobility services.

A data tunnel in a radio section is formed per terminal. When a terminal establishes a service session with two or more corresponding nodes (or terminals), for example, when downloading a file while using VoIP, it is impossible to achieve one-to-one mapping between the data tunnel in the radio section and the data tunnel in the IP network. Therefore, in this embodiment, the network access devices 2-2 and 2-3 recognize individual service traffic in the data tunnel of the radio section according to each flow on the basis of 5-tuple or Deep Packet Inspection (DPI), and establish mapping between the data tunnel and a data tunnel in an IP network of a different destination.

When mobile terminals move, the mobility control clients of the network access devices 2-2 and 2-3 acquire changed location information of terminals and changed data paths or changed data tunnel information of the radio section, and transmit traffic through the changed data traffic path or data tunnel. Further, the mobility control clients inform the IP mobility control server 10 of the changed location terminal of the terminals, and the changed data path or data tunnel information of the radio section.

Figure 7:
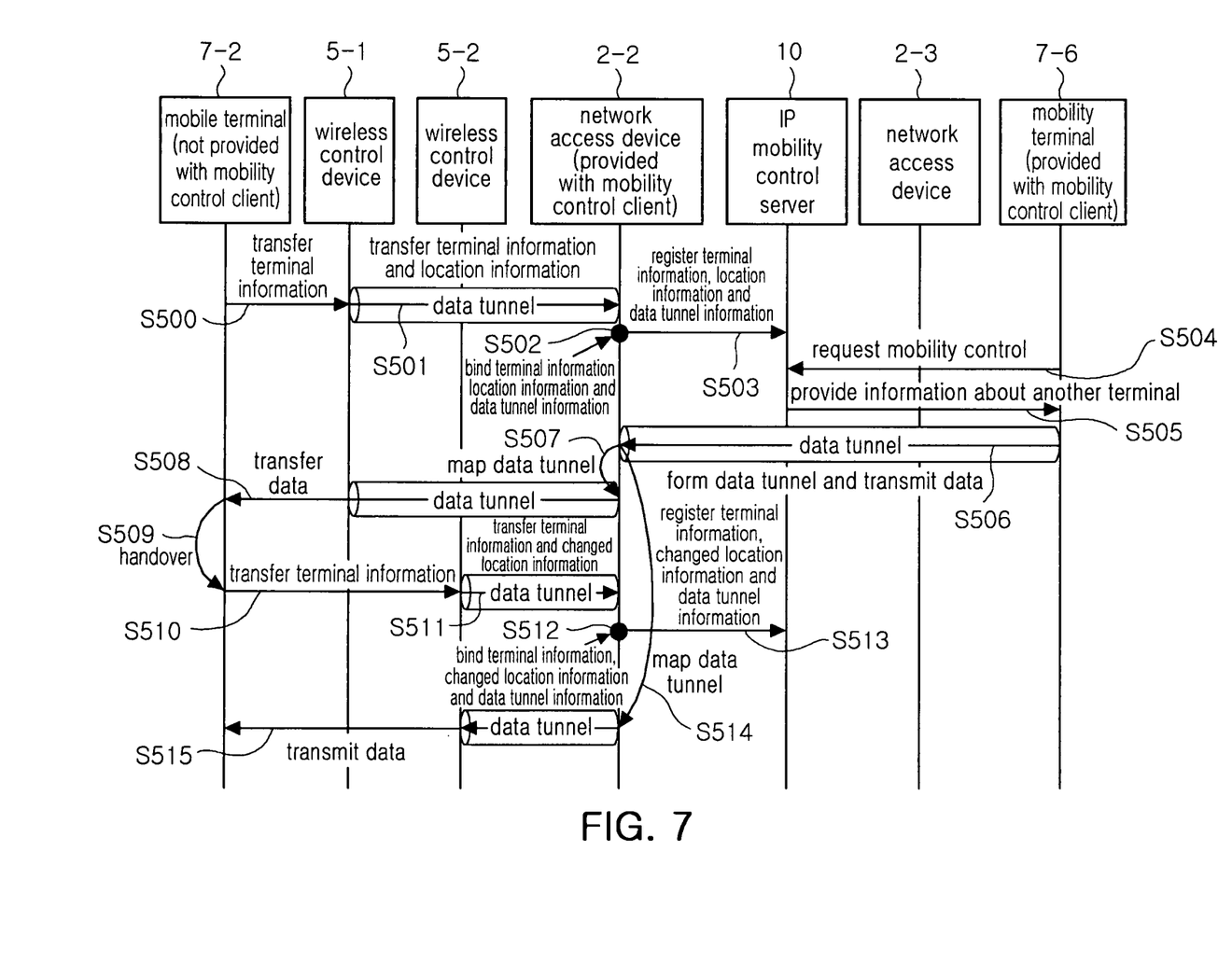
FIG. 7 is a view illustrating establishment of communications between a general terminal and an IP terminal and an IP mobility control method according to an exemplary embodiment of the present invention.

Establishing communication between an IP terminal and a general terminal according to an exemplary embodiment of the invention and an IP mobility control method will now be described with reference to FIG. 7.

First, when a mobile terminal, for example, the mobile terminal 7-2 that does not have a mobility control client therein transmits terminal information thereof to the wireless network control device 5-1 to which the mobile terminal 7-2 is connected in operation S500, the wireless network control device 5-1 informs location information (that is, information indicating that the mobile terminal 7-2 currently accesses the wireless network control device 5-1) and the terminal information of the mobile terminal 7-2 of the network access device 2-2 in operation S501.

Here, a data tunnel Dter is formed between the wireless network control device 5-1 and the network access device 2-2, and it is assumed that the network access device 2-2 has a function of a Gateway GPRS Support Node (GGSN).

Then, the network access device 2-2 records the terminal information and the location information of the mobile terminal 7-2, and information about a data tunnel of a radio section used by the mobile terminal 7-2 in operation S502, and registers the above-described information in the IP mobility control server 10 in operation S503.

In this situation, a mobile terminal, for example, the mobile terminal 7-6 having a mobility control client mounted therein requests mobility control in order to perform communications with the mobile terminal 7-2 in operation S504, the IP mobility control server 10 provides the location information and the terminal information of the mobile terminal 7-2 to the mobile terminal 7-6 in operation S505.

Then, when data communication is performed, a data tunnel in an IP network is formed between the mobile terminal 7-6 and the network access device 2-2 connected to the mobile terminal 7-2 in operation S506.

The network access device 2-2 establishes mapping between the data tunnel in the IP network and the data tunnel of the radio section in operation S507, and transmits data of the mobile terminal 7-6 to the mobile terminal 7-2, which is the other terminal, in operation S508.

When the mobile terminal 7-2 performs handover while the mobile terminal 7-2 and the mobile terminal 7-6 performs communication, and thus accesses the new wireless network control device 5-2 in operation S509, the mobile terminal 7-2 handed over to the new wireless network control device 5-2 supplies terminal information thereof to the wireless network control device 5-2 in operation S510. The wireless network control device 5-2 forms another data tunnel and supplies, through this data tunnel, the changed location information and the terminal information of the mobile terminal 7-2 to the network access device 2-2 to which the wireless network control device 5-2 is connected in operation S511.

In response to this, the network access device 2-2 records the terminal information and the changed location information of the mobile terminal 7-2, and the changed data tunnel information, binds the above-described information to the IP mobility control server 10 in operation S512, and registers the information in the IP mobility control server 10 in operation S513.

The network access device 2-2 establishes mapping between the data tunnel in the IP network and the changed data tunnel of the radio section in operation S514, so that data of the mobile terminal 7-6 is transmitted to the mobile terminal 7-2 being handed over in operation 5515.

As set forth above, according to exemplary embodiments of the invention, a converged access control method and device can perform authentication control, QoS control, traffic control and mobility control in a consistent manner using a network access device at an edge node of an IP network of a convergence ALL-IP network to effectively accommodate a subscriber network in various access environments, thereby ensuring network flexibility and scalability.

While the present invention has been shown and described in connection with the exemplary embodiments, it will be apparent to those skilled in the art that modifications and variations can be made without departing from the spirit and scope of the invention as defined by the appended claims.

What is claimed is:

1. A QoS (Quality of Service) control method using a network access device at an edge node of an IP network of a convergence ALL-IP network, the QoS control method comprising:
    controlling, by the network access device, QoS of downlink traffic on the basis of the amount of radio resources allocated, wherein the controlling of the QoS of the downlink traffic comprises:
    acquiring the amount of radio resources allocated by a wireless access device provided in a wireless subscriber network to which the downlink traffic will be transferred;
    comparing the amount of radio resources allocated with a data amount of the downlink traffic; and
    performing scheduling and shaping of guaranteed downlink traffic at each service session and performing rate shaping of non-guaranteed downlink traffic according to the amount of wireless bandwidth allocated when the data amount of the downlink traffic exceeds the amount of radio resources; and
    controlling, by the network access device, controlling QoS of uplink traffic according to bandwidth information acquirable from call control signaling or a service-specific resource allocation policy.

2. The QoS control method of claim 1, wherein the controlling of the QoS of the uplink traffic comprises:
    receiving and setting service-specific policy control setting information;
    acquiring bandwidth information acquirable from the call control signaling through an SIP proxy or a session board controller (SBC) provided in the network access device, and performing resource control per service when SIP-based traffic is received; and
    performing resource control per service on the basis of the service-specific policy control setting information when traffic, which is not based on the SIP, is received.

3. A traffic control method using an authentication server, a policy server, a network control device and a network access device in a convergence ALL-IP network, the traffic control method using the network access device comprising:
    providing, by the authentication server, authentication information about a user, having completed authentication, to the policy server and the network control device;
    setting previous usage and a total amount of traffic allowed, corresponding to the user's authentication information, in the network access device while the policy server and the network control device interoperate with each other;
    controlling of a QoS of the downlink traffic comprising:
    acquiring the amount of radio resources allocated by a wireless access device provided in a wireless subscriber network to which the downlink traffic will be transferred;
    comparing the amount of radio resources allocated with a data amount of the downlink traffic; performing scheduling and shaping of guaranteed downlink traffic at each service session and performing rate shaping of non-guaranteed downlink traffic according to the amount of wireless bandwidth allocated when the data amount of the downlink traffic exceeds the amount of radio resources; and
    tracking, by the network access device, the user's traffic usage to update the previous usage, and performing traffic control of a terminal whose updated previous usage exceeds the total amount of traffic allowed.

4. The traffic control method of claim 3, wherein the performing of the traffic control comprises blocking traffic when the updated previous usage exceeds the total amount of traffic allowed.

5. The traffic control method of claim 3, wherein a rate is charged for the excess traffic when the updated previous usage exceeds the total amount of traffic allowed.

6. An IP mobility control method using a network access device at an edge node of an IP network of a convergence ALL-IP network to provide IP mobility control services between an IP terminal having a mobility control client mounted therein and a general terminal not having a mobility control client, the IP mobility control method comprising:
    obtaining, by the network access device, terminal information and location information of the general terminal and data tunnel information of a radio section, and registering the obtained information in an IP mobility control server;
    establishing, by the network access device, mapping between a data tunnel of an IP network section and a data tunnel of a radio section when a request for communications with the general terminal is made so that the data tunnel of the IP network section is formed to perform communications with the general terminal; and
    obtaining the changed location information of the general terminal and the changed data tunnel information of the radio section when the general terminal is handed over, informing the IP mobility control server of the obtained information, and establishing mapping between the data tunnel of the IP network section and the changed data tunnel of the radio section; and
    controlling of a QoS of the downlink traffic comprising:
    acquiring the amount of radio resources allocated by a wireless access device provided in a wireless subscriber network to which the downlink traffic will be transferred;
    comparing the amount of radio resources allocated with a data amount of the downlink traffic; and
    performing scheduling and shaping of guaranteed downlink traffic at each service session and performing rate shaping of non-guaranteed downlink traffic according to the amount of wireless bandwidth allocated when the data amount of the downlink traffic exceeds the amount of radio resources.

7. The IP mobility control method of claim 6, wherein the IP mobility control server informs the IP terminal of the terminal information and the location information of the general terminal when the IP terminal requests communications with the general terminal, so that the data tunnel of the IP network section is formed to perform communications with the general terminal.

8. The IP mobility control method of claim 6, wherein the network access device obtains the terminal information and the location information of the IP terminal through the IP mobility control server to form the data terminal of the IP network section to perform communications with the IP terminal when the general terminal requests communications with the IP terminal having the mobility control client mounted therein.

9. The IP mobility control method of claim 6, wherein the network access device encapsulates traffic of the data tunnel of the radio section to transmit the encapsulated traffic through the data tunnel of the IP network section, and decapsulates traffic of the data tunnel of the IP network section to transmit the decapsulated traffic through the data tunnel of the radio section.

10. The IP mobility control method of claim 6, wherein the network access device recognizes individual service traffic of the data tunnel of the radio section and the data tunnel of the IP network section according to each flow on the basis of 5-tuple or Deep Packet Inspection (DPI), and establishes mapping between the data tunnel of the radio section and the data tunnel of the IP network section.

* * * * *